(12) United States Patent
Gossweiler, III et al.

(10) Patent No.: US 7,379,078 B1
(45) Date of Patent: May 27, 2008

(54) CONTROLLING TEXT SYMBOL DISPLAY SIZE ON A DISPLAY USING A REMOTE CONTROL DEVICE

(75) Inventors: Richard C. Gossweiler, III, Sunnyvale, CA (US); Eytan Adar, Seattle, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 296 days.

(21) Appl. No.: 11/260,055

(22) Filed: Oct. 26, 2005

(51) Int. Cl.
*G09G 5/00* (2006.01)
*G09G 5/08* (2006.01)
*G06F 3/033* (2006.01)

(52) U.S. Cl. .................. 345/660; 345/156; 345/158

(58) Field of Classification Search ............ 345/158, 345/169, 156, 660
See application file for complete search history.

(56) References Cited

U.S. PATENT DOCUMENTS

| | | | |
|---|---|---|---|
| 5,036,188 A * | 7/1991 | Keitoku | 250/216 |
| 6,034,661 A * | 3/2000 | Servan-Scheiber et al. | 345/668 |
| 6,784,872 B1 * | 8/2004 | Matsui et al. | 345/169 |
| 7,102,616 B1 * | 9/2006 | Sleator | 345/158 |
| 2003/0234799 A1 * | 12/2003 | Lee | 345/660 |
| 2004/0230904 A1 * | 11/2004 | Tada | 715/517 |

* cited by examiner

*Primary Examiner*—Xiao Wu
*Assistant Examiner*—Aaron M Guertin
(74) *Attorney, Agent, or Firm*—Eileen A Lehmann

(57) ABSTRACT

Described is a solution for controlling text symbol size on a display of a display unit based on a measurement of the distance between a remote control device and the display unit. A distance sensing module provides a distance measurement based upon detection of a transmitted signal from the remote control device. A symbol size calculation module determines a target symbol height based on the distance measurement, and a symbol size adjustment module adjusts the size of symbolic content on the display preferably using animation.

16 Claims, 10 Drawing Sheets

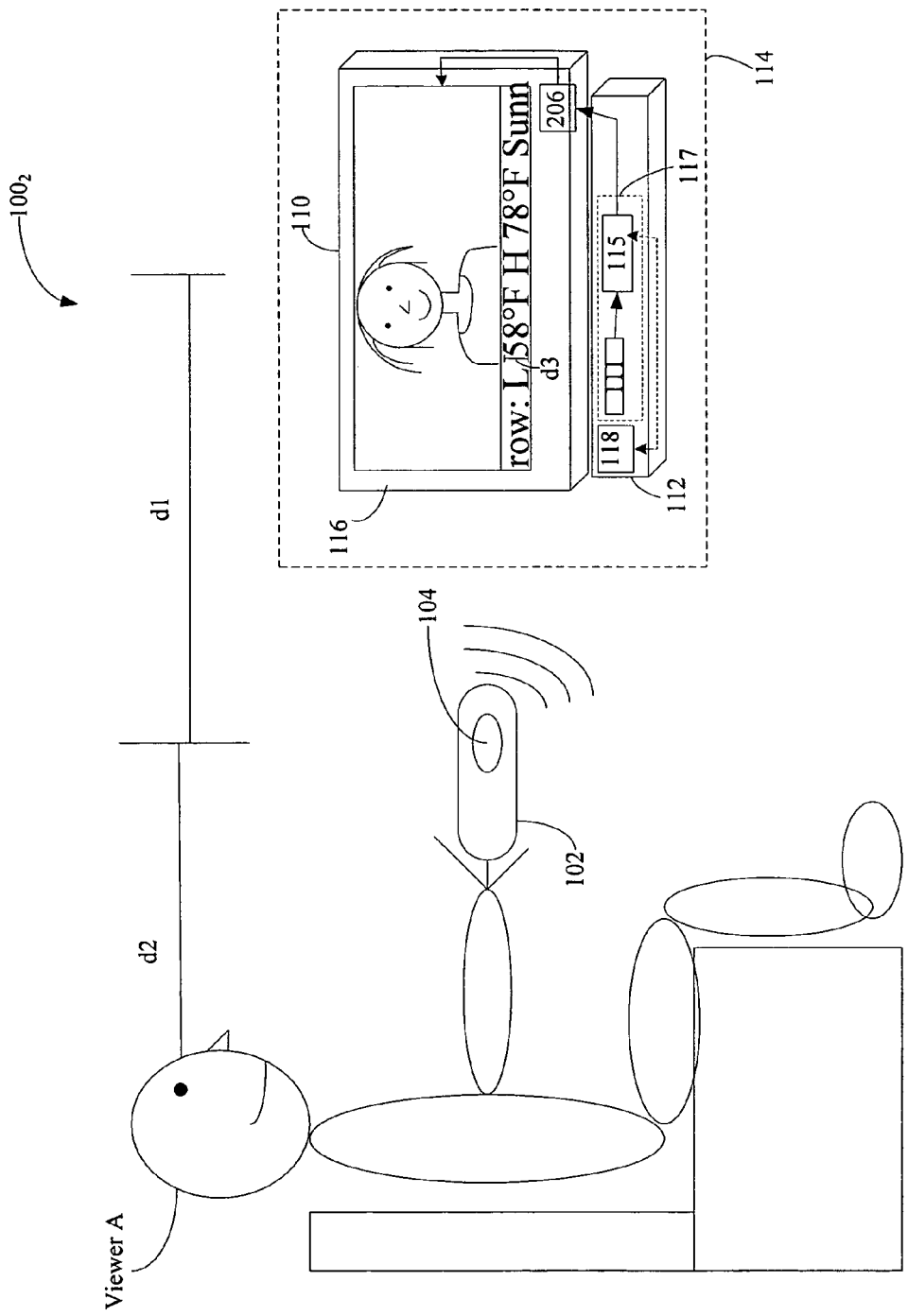

CONTROLLING TEXT SYMBOL DISPLAY SIZE ON A DISPLAY USING A REMOTE CONTROL DEVICE

BACKGROUND

The invention generally relates to controlling text symbol size on a display.

Text symbols are symbols which are represented by in digital text representation formats. Some examples are alphanumeric characters, numerals, punctuations, arrows and circles typically found in menus, and special characters such as mathematical symbols, the ampersand (&), the dollar sign ($), the registered trademark sign (®) and the atsign (@).

Menus provided by set-top boxes include text symbols. Additionally, more and more television content includes displayed overlays, some examples of which are tickers, sports scores, and background information about a show. In the context of a digital set-top box, the text symbols representing this content can be displayed at a default size for all presentations. A viewer having trouble seeing symbols clearly must leave the show with the overlay or the menu and navigate to another menu for changing symbol size in order to select another size from a set of limited choices (if this option is even available). This selected size will then be the size for all text subsequently displayed until changed via the text size menu.

Controlling text symbol display size responsive to a distance from a remote control to a sensor on a display unit for the display, or on a set-top box connected to the display and approximately the same distance as the display to the viewer's position (e.g. less than a foot in front or in back of the display)) would be more user friendly by allowing a viewer to adjust symbol size without leaving the context of a show or menu. This mechanism also allows the viewer to enlarge or decrease the size of the currently displayed text momentarily (e.g. the World Series scores) and then decrease or enlarge the next displayed text (e.g. the hockey scores) back to the previous size if desired.

SUMMARY

The present invention provides one or more solutions for controlling text symbol display size on a display of a display unit responsive to a distance of a remote control device from the display unit in accordance with one or more embodiments of the present invention.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 1B illustrates an example context in which can operate a system for controlling text symbol display size on a display of a display unit responsive to a distance of a remote control device from the display unit in accordance with another embodiment of the present invention.

The figures depict embodiments of the present invention for purposes of illustration only. One skilled in the art will readily recognize from the following discussion that other embodiments of the structures and methods illustrated herein may be employed without departing from the principles of the invention described herein.

DETAILED DESCRIPTION OF THE DRAWINGS

Figure 1A:
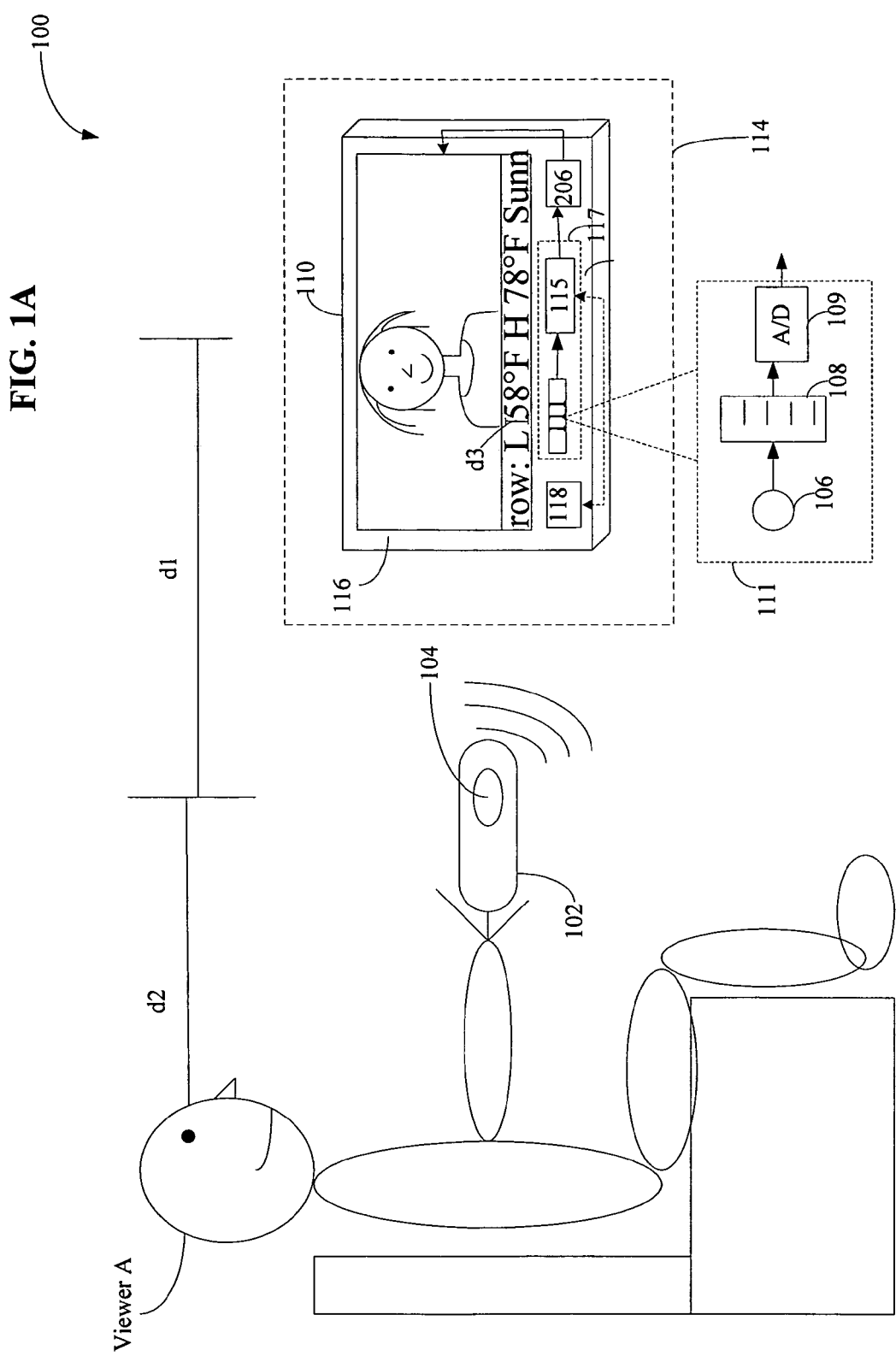
FIG. 1A illustrates an example context in which can operate a system for controlling text symbol display size on a display of a display unit responsive to a distance of a remote control device from the display unit in accordance with an embodiment of the present invention.

FIG. 1A illustrates an example context 100 of a viewer (Viewer A) watching television. A system 117 for controlling text symbol display size on the display 110 responsive to a distance of a remote control device 102 from the display unit 114 allows the viewer to adjust the text symbol display size with his remote control 102 in accordance with an embodiment of the present invention. FIG. 1A illustrates a display unit 114 including a television display 110 in a supporting encasement 116. In this embodiment, the display unit 114 includes as part of the system 117 a symbol size adjustment system 115 and part of a distance sensing system 111 which is communicatively coupled to provide at least one digital output value representing a distance measurement from the remote control 102 to the display unit 114 to the symbol size adjustment system 115 which is communicatively coupled to a display module 206 which controls the presentation of content on the display 110.

In this embodiment, the distance sensing system 111 includes a transmitter 104 on the remote control device 102 for generating a light signal, a detector lens 106 which focuses a received signal from the transmitter 104 onto a sensor 108 which provides an analog output signal to analog-to-digital converter 109 for a digital output value usable by the symbol size adjustment system 115. In one example, the transmitter 104 is an infrared light emitting diode (LED) that projects a spot of modulated light onto the detector lens 106 which focuses the spot of light onto a linear position-sensitive detector element 108. Depending on the distance from the remote control 102 to the detector lens 106, the angle of the incoming reflected light will change, and the spot of light is projected to a different point along the position sensor 108. Thus, the location of the spot on the sensor corresponds to a distance to the remote control device 102.

FIG. 1A illustrates just one example of a distance sensing system 111. In other examples, the transmitter 104 is the transmitter used ordinarily for remote control functions such as volume control and channel switching. In another example, a radio frequency signal transmitter can be used. In another example, the transmitter 104 and the sensor 108 can both be on the remote control device 102 in which a distance measurement is based on a return signal bounced off the glass or plastic of the display 110 and is communicated as data to a remote control receiver unit 118 which in turn sends the data to the symbol size adjustment module 115 in the display unit 114. Other distance sensing systems can also be used that base measurement on another characteristic, some examples of which are those that use sound, timing or phase shift.

Three reference distances are represented by the lines labeled d1 and d2. The distance d1 represents the distance from the remote control device 102 to the portion of the distance sensing system 111 in the set-top box 112 as represented by one or more digital output values from the distance sensing system 111. The distance d2 is a preconfigured amount representing the viewing distance from Viewer A's eyes to the remote control device 102 which is added as an offset to d1 for representing the total distance from Viewer A's eyes to the display 110. The height d3 represents the symbol height desired for the viewing distance (d1+d2) and can be calculated from the equation d3=2*(d1+d2)*tan(f/2) where f is a desired visual angle to subtend. For example, if the symbol height is to subtend an angle equal to a human fovea (2 degrees or 0.035 radians), and the total distance from Viewer A's eyes to the display 110 is determined to be ten (10) feet (d1+d2=10) then the symbol height d3=20 tan(0.035/2)=0.35 feet or approximately 4 inches. The human foveal visual angle is between 1 and 2 degrees. The calculation derives from a right triangle formed by (d1+d2) as the adjacent leg which bisects the viewer's foveal angle f by 2, thus making f/2 the angle to which one half of the desired symbol height d3 is the opposite leg. From the end of this opposite leg that is not perpendicular to (d1+d2), the hypothenuse leg extends back to the viewer's eye.

FIG. 1B illustrates another example context 100$_2$ of another embodiment of a system 117 for controlling text symbol size on a display 110 of a display unit 114$_2$ responsive to a distance of a remote control device from the display unit 114$_2$ in accordance with another embodiment of the present invention. In this example, the display unit 114$_2$ includes a set-top box 112 which includes the system 117 including at least a part of the distance sensing unit 111 and the symbol size adjustment module 115. In a display unit 114$_2$ including a separate set-top box, an example of which is a cable box or a digital video recorder (DVR), viewers tend to place a set-top box in the same vertical line with a television screen and the remote control reception units tend to be almost in the same vertical line and with a horizontal offset of a few inches generally. Thus, a distance sensing system 111 in a set-top box or other processor controlled unit which is typically located underneath or on top of the display (111). The distance sensing system 111 thus provides a sensed distance that is a close approximation to the distance between the remote control device 102 and the display 110.

Figure 2A:
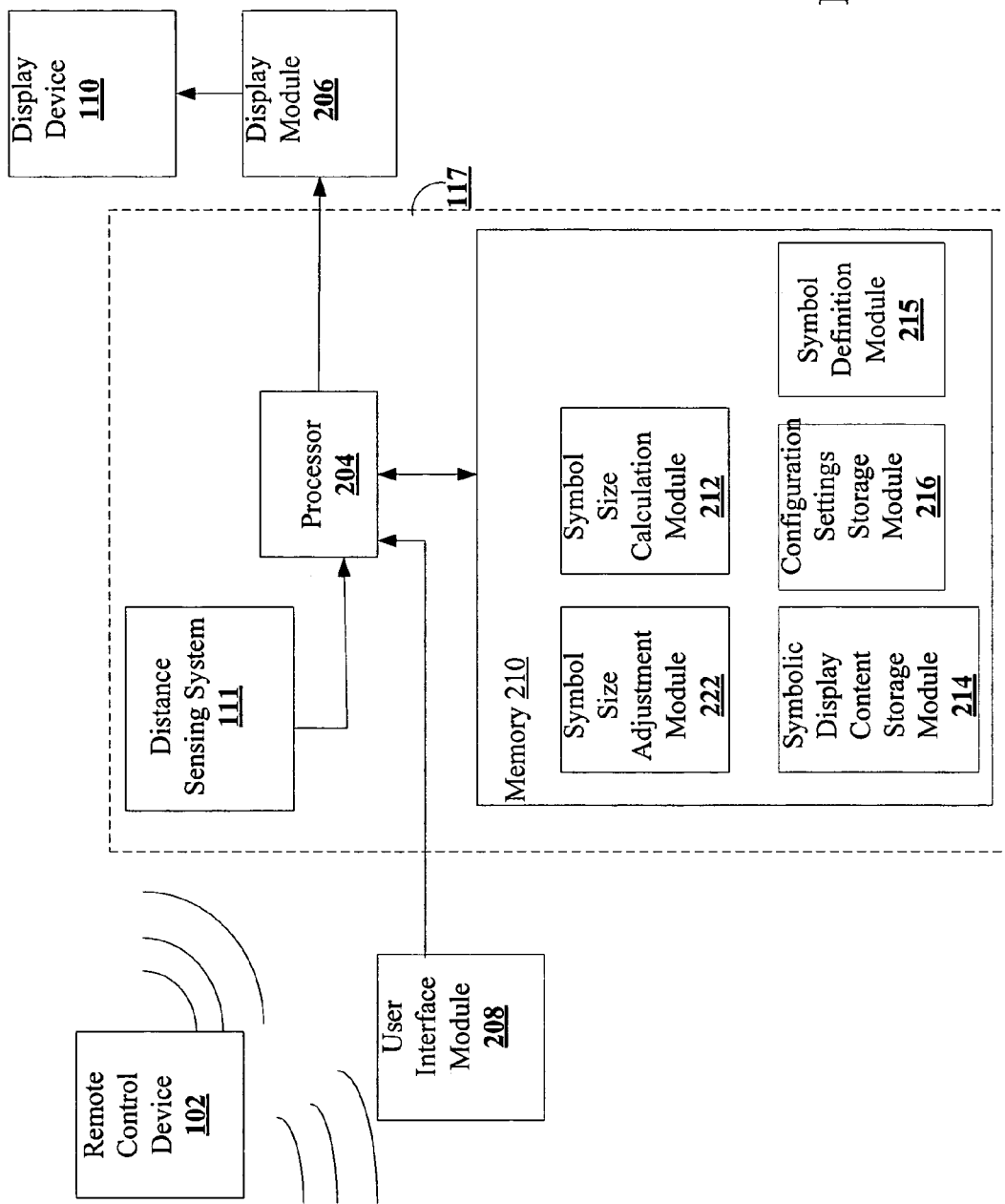
FIG. 2A is an architectural block diagram of a system for controlling text symbol display size on a display of a display unit of a display unit responsive to a distance of a remote control device from the display unit in accordance with an embodiment of the present invention.

FIG. 2A is an architectural block diagram of a system 117 for controlling text symbol display size on a display of a display unit responsive to a distance of a remote control device from the display unit in accordance with an embodiment of the present invention. The system 117 comprises a processor 204 communicatively coupled to receive digital output from the distance sensing system 111, and also communicatively coupled to a user interface 208 for processing commands from the remote control device 102 (e.g. channel up, volume down, next selection in a menu, etc.). The processor 204 is accessible to a memory 210, and is communicatively coupled to a display module 206 for controlling the display device 110.

The memory 210 includes a symbol size calculation software module 212 for calculating a target text symbol height, and a symbolic display content storage module 214 for text symbolic content which can be displayed (e.g., a display overlap of local weather conditions for a content selection or a menu), and a symbol definition module 215 including definitions for text symbols. An example of a definition for a text symbol is a vector graphic representation representing a typeface which can be scaled to a font size, for example a point size, within a range by outline font software (e.g., TrueType and Adobe's Type 1). Another example of a definition for a text symbol is a bitmap font which is a digital representation of a font that is already fixed in size or has a limited set of sizes.

The memory 210 further includes a configuration settings storage module 216 including one or more predetermined values for d2 as well as other information related to displaying changing symbol sizes, some examples of which can be a rendering speed of the display module 206, and resolution of the display (e.g., 110), and a symbol size adjustment module 222 which adjusts symbol size to a target symbol size corresponding to the calculated symbol height. The symbol size adjustment module 222 can use the display-related information stored in the configuration settings storage module 216 to determine which transition effect (e.g., animation, fade in fade out) can be supported when changing the symbol size.

Figure 2B:
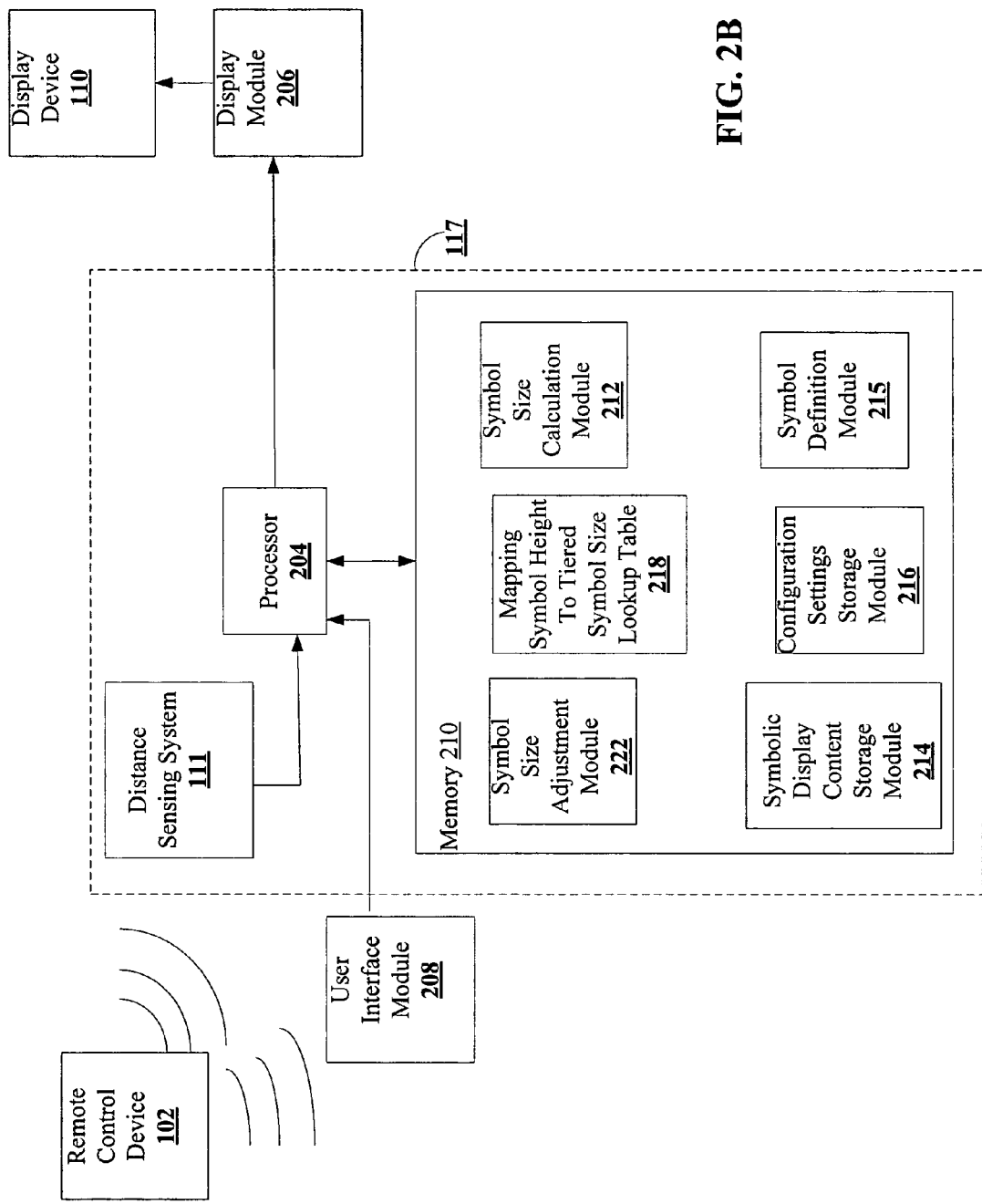
FIG. 2B is an architectural block diagram of a system for controlling text symbol display size on a display of a display unit responsive to a distance of a remote control device from the display unit in accordance with another embodiment of the present invention.

FIG. 2B is an alternate embodiment of the system embodiment 117 in FIG. 2A in that the memory 210 further includes a lookup table 218 for mapping a determined symbol height d3 to a tiered symbol size within a set of predetermined symbol sizes. For example, a determined text symbol height can be within a range which maps into one of a set of predetermined text symbol sizes. An example of such a set of predetermined text symbol sizes would be small, medium and large sizes.

Figure 3:
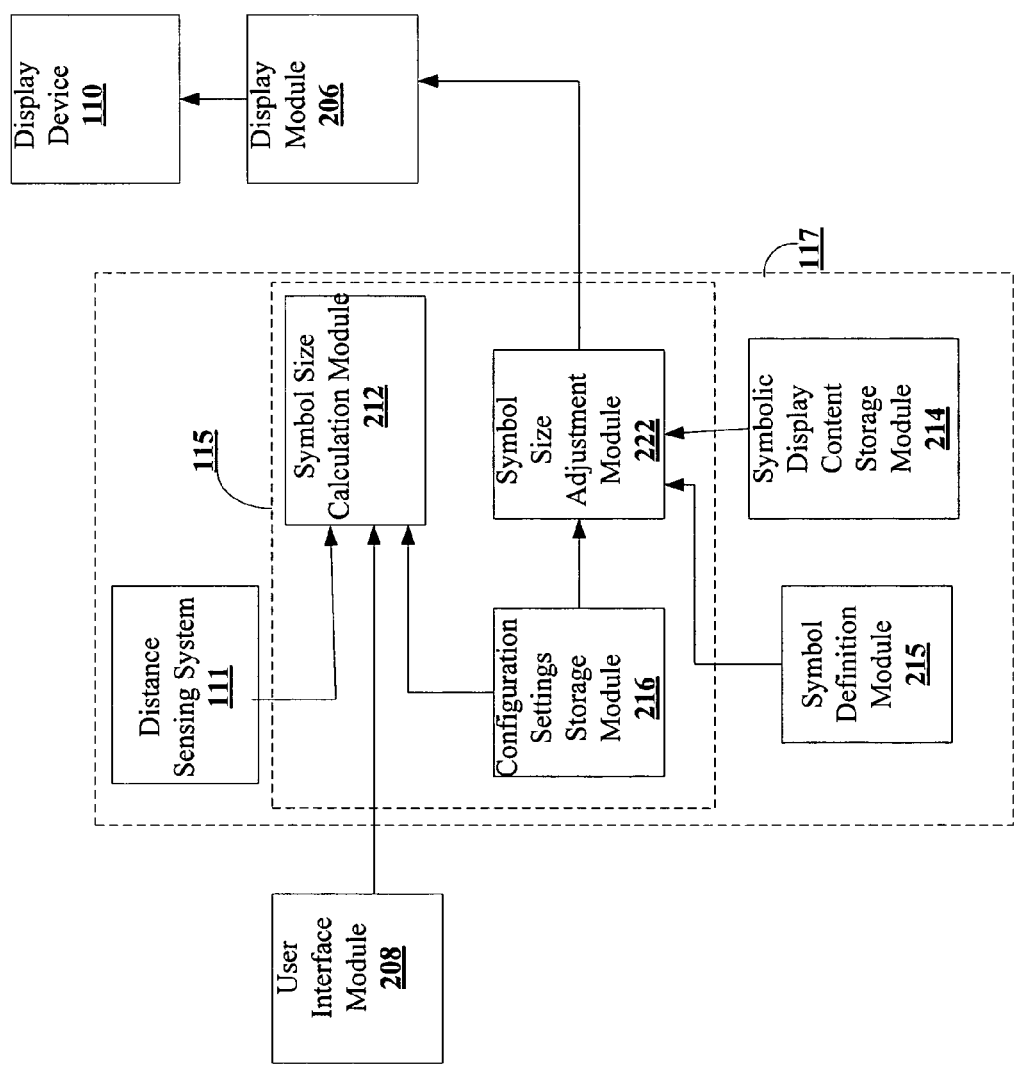
FIG. 3 is a functional block diagram of a system for controlling text symbol display size on a display of a display unit responsive to a distance of a remote control device from the display unit in accordance with an embodiment of the present invention.

FIG. 3 is a functional block diagram of a system 117 for controlling text symbol display size on a display of a display unit responsive to a distance of a remote control device from the display unit in accordance with an embodiment of the present invention. The symbol size calculation module 212 is communicatively coupled to receive one or more digital output values from the distance sensing system 111. Each digital output value corresponds to a distance measurement between a viewer of the display and the display unit. The symbol size calculation module 212 determines a symbol height based on the one or more distance measurements. An example calculation that can be used to determine the text symbol height is illustrate below:

$$d3 = 2*(d1+d2)*\tan(f/2) \text{ in which}$$

d3: symbol height d1: distance from remote control device to the distance sensing system d2: distance estimate from viewer's eyes to remote control device f: visual angle to subtend equal to about human fovea angle which is between 1 and 2 degrees.

Using this calculation in the embodiment of FIG. 3, the symbol size calculation module 212 has access to the configuration settings storage module 216 for retrieving a value, d2, representing an estimate of the distance of the remote control from the viewer's eyes to the remote control device 102 for use in determining a text symbol height size.

The symbol size calculation module 212 is communicatively coupled to send the calculated symbol height d3 to the symbol size adjustment module 222 which selects a symbol size based on the symbol height. A typical standard for representing the size of a symbol is a font size which is typically stated as a number of points. For each style of font, the font size for each point size height has a predefined width, so once the symbol size calculation module 212 determines a height, the symbol size adjustment module 222 selects the nearest font size for that point size for the style of the symbolic content for display accessible via symbolic display content storage module. The symbol size adjustment module 222 has access to the configuration settings module 216 for display specific information such as the resolution and the rendering speed of the display module 206. The symbol size adjustment module 222 adjusts the font size of the symbol content for display, for example, by adjusting an associated font size in its meta-data, and sends a version of the symbol content with the adjusted symbol size to the display module 206 for rendering on the display device 110.

Each of the modules illustrated in FIG. 3 or a portion thereof can be implemented in software suitable for execution on a processor and storage in a computer-usable medium, hardware, firmware or any combination of these. Computer-usable media include any configuration or medium capable of storing or transferring programming, data, or other digital information. Examples of computer-usable media include a data transmission as well as various memory embodiments such as random access memory and read only memory, which can take a variety of forms, some examples of which are a hard disk, a disk, flash memory, or a memory stick.

Figure 4:
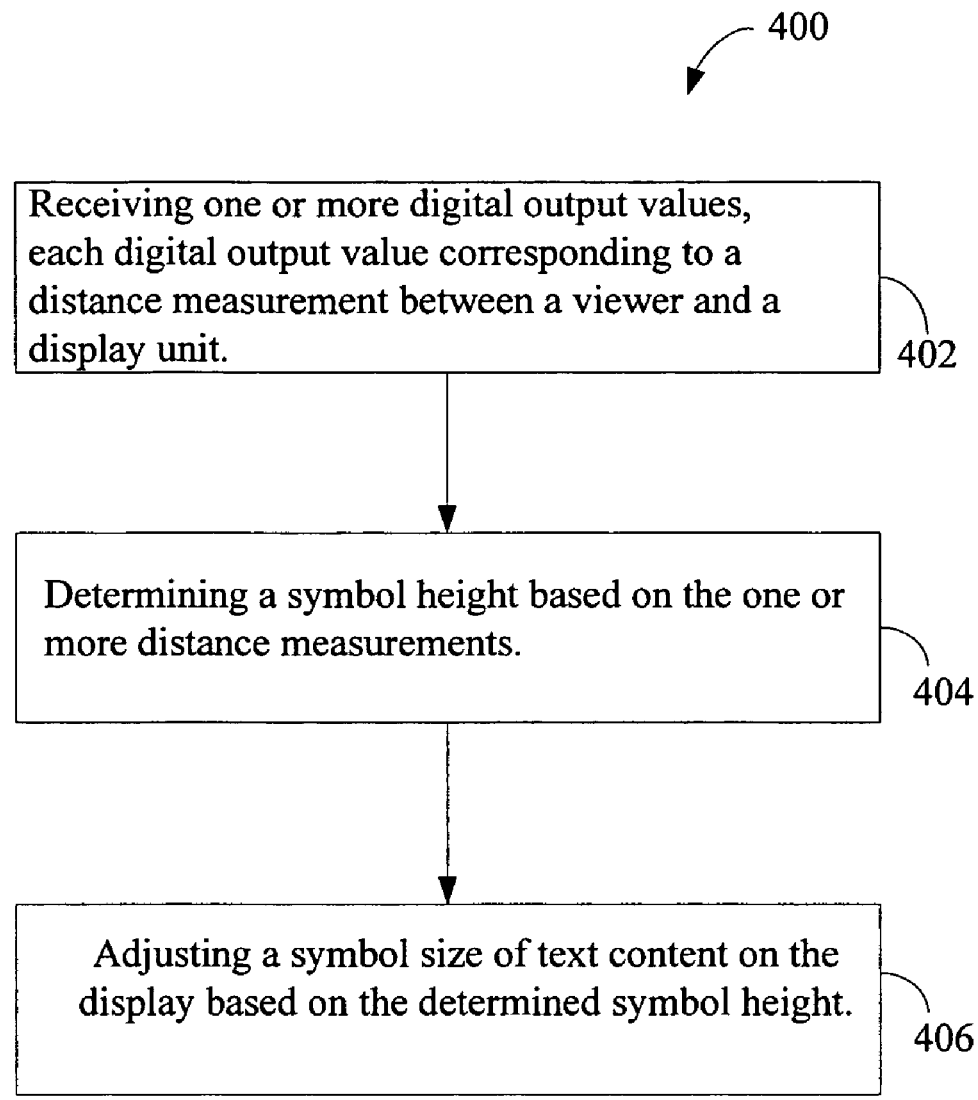
FIG. 4 is a flow diagram of a method for controlling text symbol display size on a display of a display unit responsive to a distance of a remote control device from the display unit in accordance with an embodiment of the present invention.

FIG. 4 is a flow diagram of a method for controlling text symbol display size on a display of a display unit responsive to a distance of a remote control device from the display unit in accordance with an embodiment of the present invention. For illustrative purposes only and not to be limiting thereof, the method embodiment 400 of FIG. 4 is discussed in the context of the system 300 of FIG. 3. The symbol size calculation module 212 receives 402 one or more digital output values, each digital output value corresponding to a distance measurement between a viewer and a display unit (e.g. 114), and determines 404 a symbol height based on the one or more distance measurements, and the symbol size adjustment module 222 adjusts 406 the symbol size of text content on the display 110 based on the determined symbol height.

Figure 5:
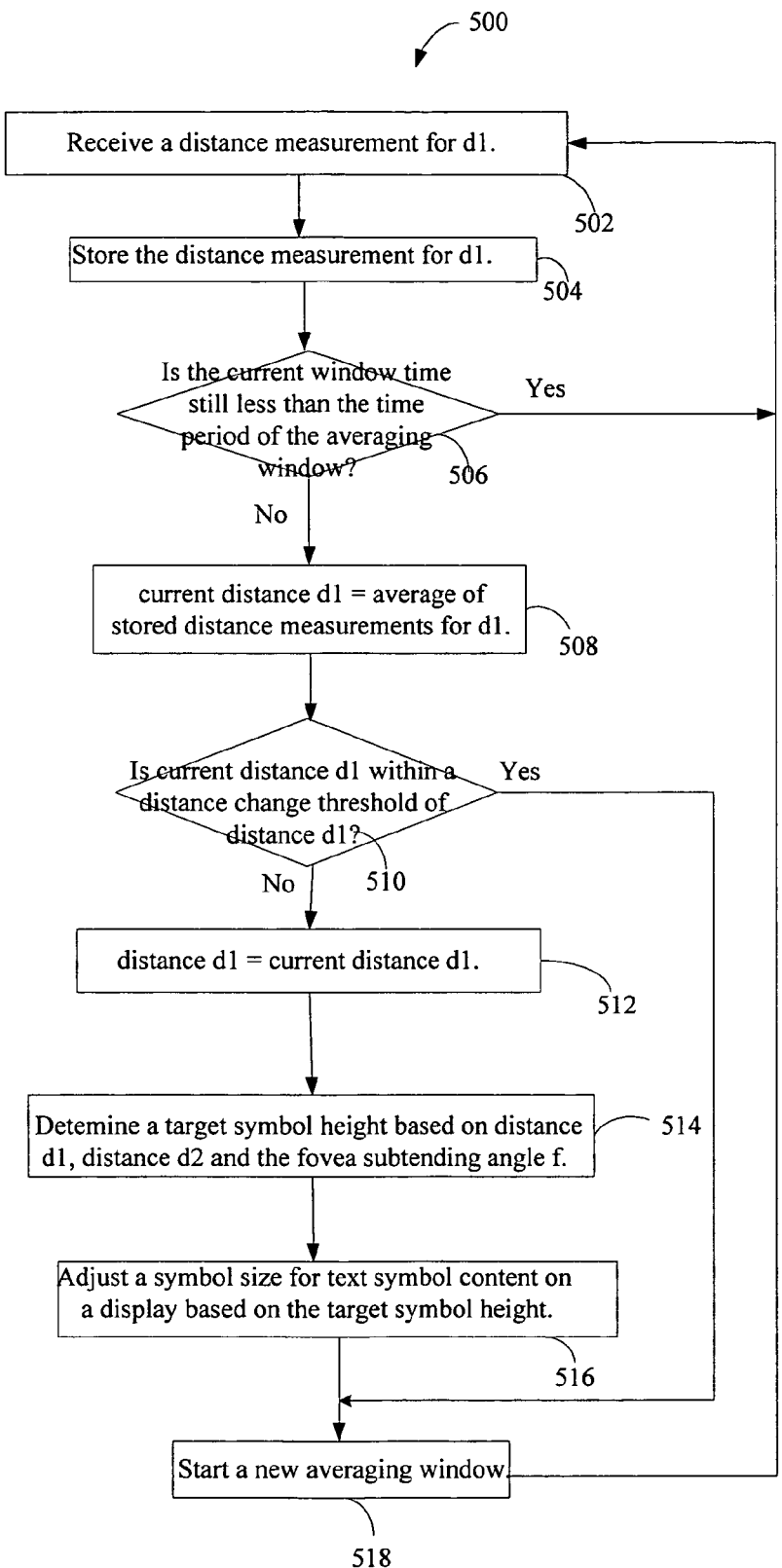
FIG. 5 is a flow diagram of a method for controlling text symbol display size on a display of a display unit responsive to a distance of a remote control device from the display unit in accordance with another embodiment of the present invention.

FIG. 5 is a flow diagram of a method 500 for controlling text symbol display size on a display of a display unit responsive to a distance of a remote control device from the display unit in accordance with another embodiment of the present invention. For illustrative purposes only and not to be limiting thereof, the method embodiment 500 of FIG. 5 is discussed in the context of the system 300 of FIG. 3. In this embodiment, the symbol size calculation module 212 performs the symbol size calculation based on an average of distance d1 measurements from the remote sensing unit 111 received over a time period, a window. The symbol size calculation module 212 receives 502 a distance measurement for d1, stores 504 the distance measurement for d1 and determines 506 whether the current window time is still less than the time period of the averaging window. Responsive to a positive determination, the symbol size calculation module 212 performs acts 502, 504 and 506 for another distance measurement for d1, until the result from the calculation module's 212 determination 506 is that the current window time has met or exceeded the average window time period. Responsive to this result, the symbol size calculation module 212 sets 508 current distance d1 to the average of the stored distance measurements for d1 for the current window time.

The size calculation module 212 determines 510 whether the current distance d1 is within a distance change threshold of distance d1. A distance change threshold is a predetermined distance delta amount that if not exceeded does not warrant a change in the symbol size. If the distance change is determined 510 to be within the threshold, the calculation module 212 starts 518 a new averaging window time period and repeats processing 502, 504, 506 for the distance measurements falling within the new averaging window. If the calculation module 212 determines the current distance d1 is not within the distance change threshold, the symbol size calculation module sets 512 the current distance d1 to be distance d1, determines 514 a target symbol height based on distance d1, distance d2 and the fovea subtending angle f, adjusts 516 a symbol size for text symbol content on a display based on the target symbol height, and starts 518 a new averaging window for processing of subsequent distance d1 measurements. Thus, if the user suddenly moves closer, then the distance suddenly changes by an amount greater than the pre-configured threshold, causing the symbol size to change.

Figure 6:
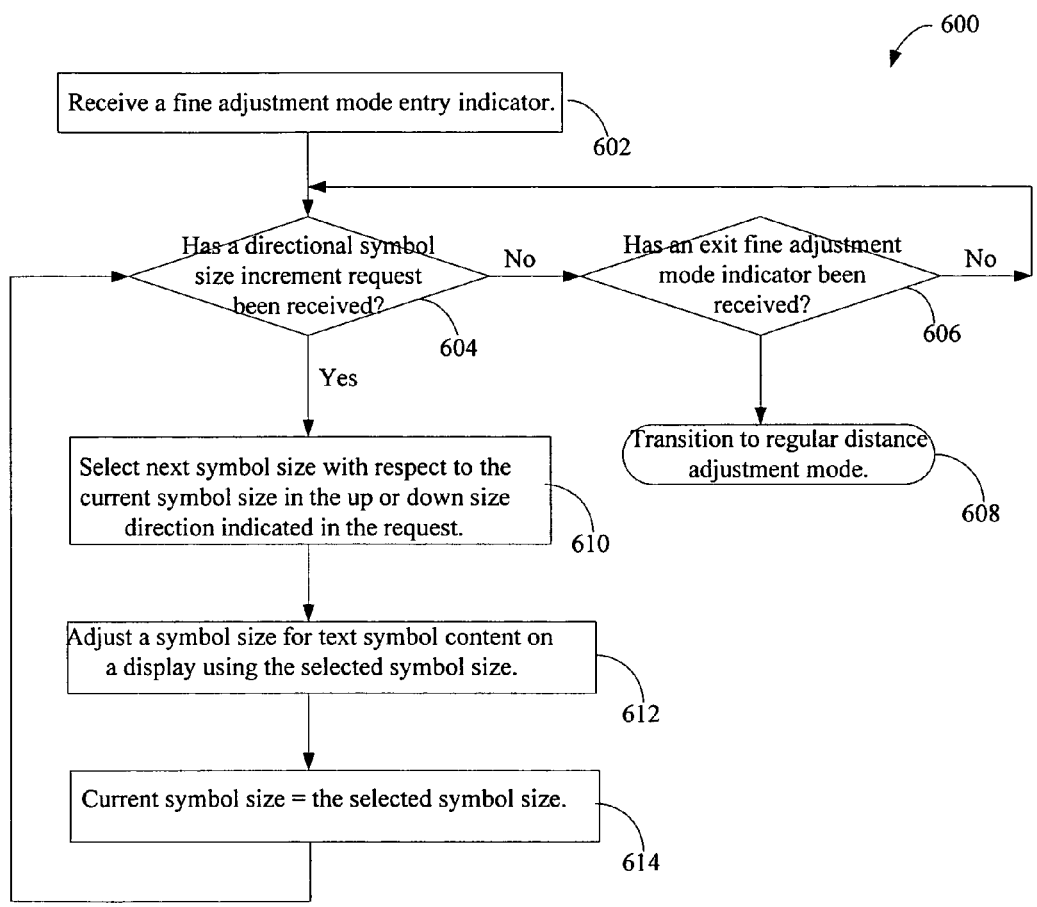
FIG. 6 is a flow diagram of a method for controlling text symbol display size on a display of a display unit through manual fine adjustment in accordance with another embodiment of the present invention.

FIG. 6 is a flow diagram of a method for controlling text symbol display size on a display of a display unit through manual fine adjustment in accordance with another embodiment of the present invention. For illustrative purposes only and not to be limiting thereof, the method embodiment 600 of FIG. 6 is discussed in the context of the system 300 of FIG. 3. From the user interface module 204, the symbol size adjustment module 222 can receive an indicator for a fine adjustment mode for adjusting symbol size. In one example, a sensor (e.g., a thermal sensor, a pressure sensor, or a motion sensor) can detect that the remote control is being held so that a smaller range of movement of the remote control device causes size adjustment within a symbol size range. In another example, a fine adjustment mode indicator is user input indicating a key is being held down and movement of a certain distance of the remote control in the forward direction can cause an increment or decrement depending on the selected protocol of the symbol size. Similarly, backward motion of the remote control can cause an increment or decrement depending on the selected protocol of the symbol size. In yet another example, a key on the remote control can be selected to enter a manual fine adjustment mode, and up down or left right arrows signals from arrow buttons or channel up/channel down or volume up/volume down buttons can be received by the remote control receiver unit 118 and sent to the symbol size adjustment module 115 for processing to determine in which direction to increment or decrement the symbol size.

The symbol size adjustment module 222 receives 602 a fine adjustment mode entry indicator receives and determines 604 whether a directional symbol size change request has been received. If no such request has been received, the adjustment module 222 determines 606 whether an exit fine adjustment mode indicator has been received. An exit fine adjustment mode indicator could be user input pressing the manual mode to exit it or a timeout period in which no remote control selector activations are indicated. If the an exit fine adjustment mode indicator has been received, the symbol size adjustment module 222 transitions 608 back to a regular distance adjustment mode which performs activity such as that described in FIG. 5. If the exit mode indicator has not been received, the module 222 waits for a direction symbol size change request.

Responsive to receiving a directional symbol size change request, the symbol size adjustment module 222 selects 610 the next symbol size with respect to the current symbol size in the up or down size direction indicated in the request, adjusts 612 the symbol size for text symbol content on the display using the selected symbol size and set 614 the selected symbol size to the current symbol size.

Figure 7:
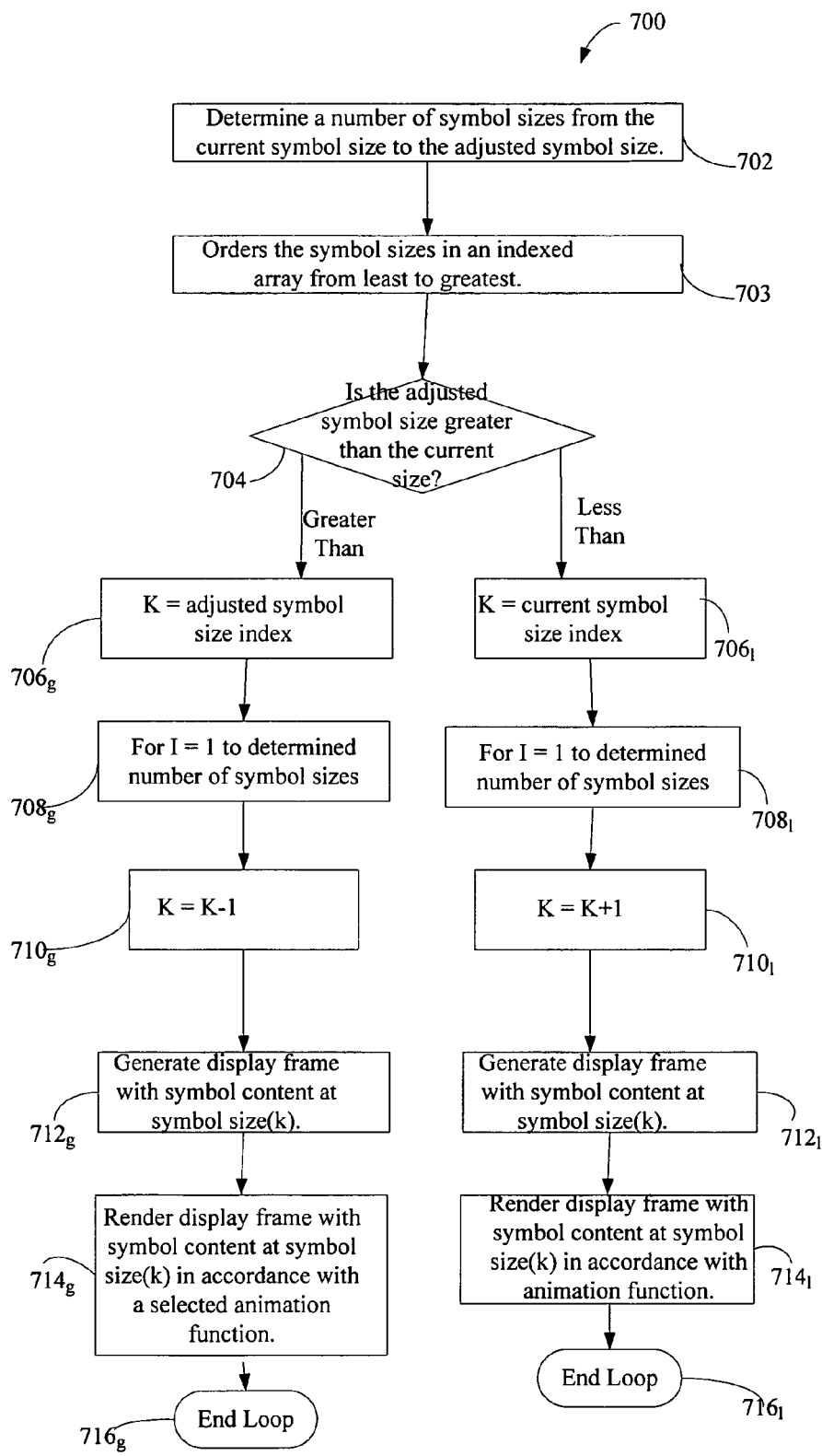
FIG. 7 is a flow diagram of a method for adjusting text symbol display size to a determined symbol size using animation in accordance with another embodiment of the present invention.

FIG. 7 is a flow diagram of a method for adjusting text symbol display size to a selected symbol size using animation in accordance with another embodiment of the present invention. For illustrative purposes only and not to be limiting thereof, the method embodiment 500 of FIG. 5 is discussed in the context of the system 300 of FIG. 3. The symbol size adjustment module 222 determines 702 a number of symbol sizes from the current symbol size to the adjusted symbol size, orders 703 the symbol sizes in an indexed array from least to greatest, and determines 704 whether the adjusted symbol size is greater than the current symbol size. Responsive to the adjusted symbol size being greater than the current symbol size, the symbol size adjustment module 222 sets 706$_g$ an indexing parameter K=adj Listed symbol size index and sets 708$_g$ a loop range for a loop parameter I to cover the determined number of symbol sizes. In each loop iteration, symbol size adjustment module decrements 710$_g$ the parameter K, generates 712$_g$ a display frame with symbol content at the symbol size indexed by K, and renders 714$_g$ the display frame with symbol content at the symbol size indexed by K in accordance with a selected animation function.

Responsive to the adjusted symbol size being less than the current symbol size, the symbol size adjustment module 222 sets 706$_l$ an indexing parameter K=current symbol size index and sets 708$_l$ a loop range for a loop parameter I to cover the determined number of symbol sizes. In each loop iteration, symbol size adjustment module increments 710$_l$ the parameter K, generates 712$_l$ a display frame with symbol content at the symbol size indexed by K, and renders 714$_l$ the display frame with symbol content at the symbol size indexed by K in accordance with a selected animation function.

Figure 8:
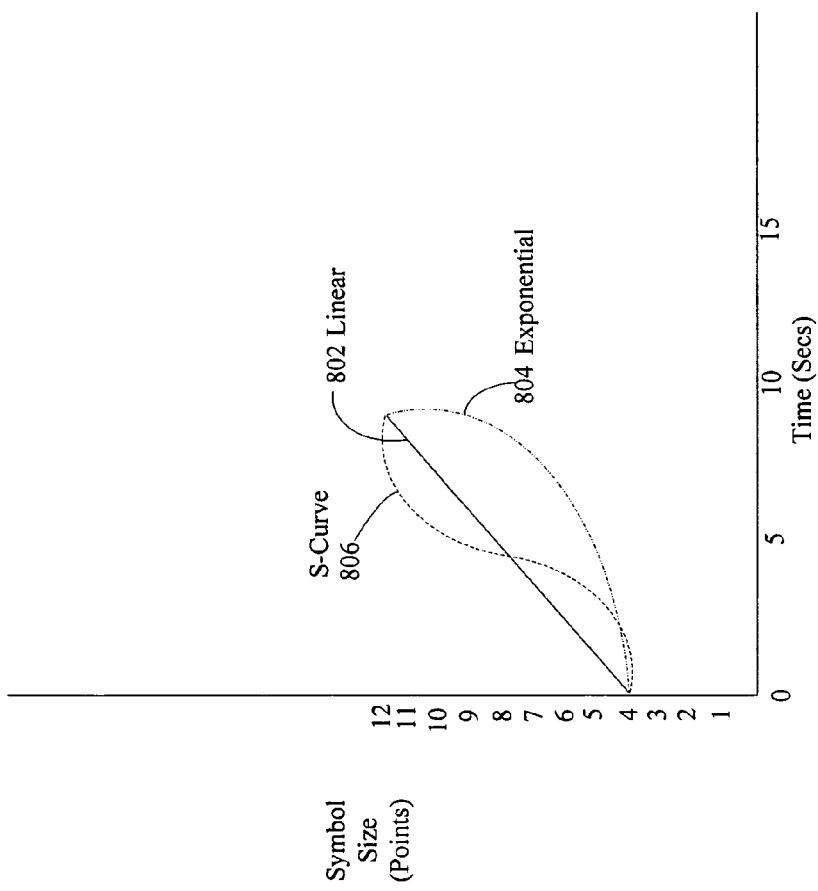
FIG. 8 is a plot diagram illustrating some examples of animation functions that can be used in one or more embodiments of the present invention.

FIG. 8 is a plot diagram illustrating some examples of animation functions that can be used in one or more embodiments of the present invention. FIG. 8 represents symbol size in point sizes on the vertical axis and time in seconds on the horizontal axis. In this example, each of the animation functions 802, 804, 806 transitions from a 4 point size to a 12 point size in about 8 seconds. One example of an animation function is an S-Curve 802 in which the rate of change of the symbol size is slow at first, then has an acceleration of the rate of change which then tapers off near the target symbol size. Another example of an animation function is a linear function 804 which has a constant rate of change for the point size, 1 point size per second. The third example is an exponential function in which the rate of change of the point size increases exponentially.

Alternatively, some display units 114 such as that in FIG. 2B can use a limited set of symbol sizes (for example, unscalable bitmap fonts as opposed to scalable vector graphic representations) in which a distance tier (e.g., 4 to 5 feet) is assigned a symbol size associated with that distance, for example by using a mapping table 218. Additionally, some display systems do not have fast enough rendering speeds for a smooth or non-jumpy and fast animation from for example an 8 point font size to a 20 point font size. Instead of animation techniques for displaying the change in symbol size, other transition effects can be used, for example fade in and fade out, in changing from one size to another can be used to accommodate displays with slower rendering speeds.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the hereto appended claims. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Of course, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming.

What is claimed is:

1. A method for controlling text symbol display size on a display of a display unit responsive to a distance of a remote control device from the display unit comprising:

receiving one or more digital output values, each digital output value corresponding to a distance measurement between a remote control device and the display unit;

determining a symbol height based on the one or more distance measurements which comprises determining the symbol height based on a distance value (d1) represented by the one or more distance measurements, a pre-configured distance (d2) representing the distance from a viewer's eye to the remote control device, and an angle (f) approximately equal to an angle for a human fovea in accordance with 2 multiplied by (d1+d2) multiplied by tan(f/2); and adjusting symbol size of text content on the display based on the determined symbol height.

2. The method of claim 1 wherein determining a symbol height based on the one or more distance measurements further comprises that the one or more distance measurements are based on digital output values received within an averaging window time period.

3. The method of claim 1 wherein adjusting symbol size of text content on the display based on the determined symbol height further comprises:
responsive to a manual fine adjustment mode being indicated, adjusting the symbol size of the text content in accordance with a directional change request for the symbol size.

4. A system for controlling text symbol display size on a display of a display unit responsive to a distance of a remote control device from the display unit comprising:
a distance sensing system for detecting a distance from the remote control device to the display unit including a sensor and an analog to digital converter communicatively coupled to receive one or more sensor output signals for conversion to one or more digital output values representative of the distance between the remote control device and the display unit;
a memory;
a processor accessible to the memory and communicatively coupled to receive the one or more digital output values from the analog to digital converter;
a symbol size calculation software module executing on the processor, receiving the one or more digital output values and storing the one or more digital output values in the memory and determining a symbol height based on a distance value (d1) represented by the one or more digital output values, a pre-configured distance (d2) representing the distance from a viewer's eye to the remote control device, and an angle (f) approximately equal to an angle for a human fovea in accordance with 2 multiplied by (d1+d2) multiplied by tan(f/2); and
a symbol size adjustment software module for adjust symbol size of text content for display on the display based on the determined symbol height.

5. The system of claim 4 wherein
the memory further comprises at least one vector graphic representation for at least one font which representation is capable of being adjusted to different point sizes; and
the symbol size adjustment software module adjusts the symbol size of text content for display to a point size based on the determined symbol height.

6. The system of claim 4 wherein the symbol size adjustment module adjusts the symbol size of text content on the display using animation.

7. The system of claim 4 wherein the symbol size adjustment module adjusts the symbol size of text content on the display using a fade in, fade out transition effect.

8. The system of claim 4 wherein the memory further comprises a lookup table mapping the symbol height to one tier size of a plurality of tiers of symbol sizes; and
wherein the symbol size adjustment software module adjusts the symbol size of text content to the selected tier symbol size for display on the display using a fade in, fade out transition effect.

9. The system of claim 4 wherein the memory further comprises a lookup table mapping the symbol height to one tier size of a plurality of tiers of symbol sizes; and
wherein the symbol size adjustment software module adjusts the symbol size of text content to the selected tier symbol size for display on the display using animation.

10. The system of claim 4 wherein the distance sensing system for detecting a distance from the remote control device to the display unit includes a transmitter of the remote control device, the sensor being located on the remote control device for receiving a return signal generated by a signal originating from the transmitter which is bounced back from the display, and the analog to digital converter being communicatively coupled to the sensor on the remote control to receive one or more sensor output signals for conversion to corresponding digital output values which the remote control device transmits to the display unit.

11. The system of claim 4 wherein the distance sensing system including a transmitter of the remote control device and the sensor is positioned on a portion of the display unit for receiving a signal originating from the remote control device.

12. The system of claim 11 wherein the portion of the display unit is a portion of a set-top box.

13. The system of claim 11 wherein the portion of the display unit is a portion of an encasement for the display.

14. The system of claim 4 wherein the distance sensing system includes as a sensor a linear position-sensitive detector element and a detector lens optically coupled for focusing light onto the linear position-sensitive detector element wherein a transmitter of the remote control device projects a spot of light onto the detector lens which focuses the spot of light onto the linear position-sensitive detector element in which the location of the spot on the detector element corresponds to a distance to the remote control device.

15. A computer usable medium comprising software for causing a processor to execute a method for controlling text symbol display size on a display of a display unit responsive to a distance of a remote control device from the display unit, the method comprising:
receiving one or more digital output values, each digital output value corresponding to a distance measurement between a remote control device and the display unit;
determining a symbol height based on the one or more distance measurements which comprises determining the symbol height based on a distance value (d1) represented by the one or more distance measurements, a pre-configured distance (d2) representing the distance from a viewer's eye to the remote control device, and an angle (f) approximately equal to an angle for a human fovea in accordance with 2 multiplied by (d1+d2) multiplied by tan(f/2); and
adjusting symbol size of text content on the display based on the determined symbol height.

16. A system for controlling text symbol display size on a display of a display unit responsive to a distance of a remote control device from the display unit comprising:
means for receiving one or more digital output values, each digital output value corresponding to a distance measurement between a remote control device and the display;
means for determining a symbol height based on the one or more distance measurements which comprises means for determining the symbol height based on a distance value (d1) represented by the one or more distance measurements, a pre-configured distance (d2) representing the distance from a viewer's eye to the remote control device, and an angle (f) approximately equal to an angle for a human fovea in accordance with 2 multiplied by (d1+d2) multiplied by tan(f/2); and
means for adjusting symbol size of text content on the display based on the determined symbol height.

* * * * *

UNITED STATES PATENT AND TRADEMARK OFFICE
CERTIFICATE OF CORRECTION

| | |
|---|---|
| PATENT NO. | : 7,379,078 B1 |
| APPLICATION NO. | : 11/260055 |
| DATED | : May 27, 2008 |
| INVENTOR(S) | : Richard C. Gossweiler, III et al. |

Page 1 of 1

It is certified that error appears in the above-identified patent and that said Letters Patent is hereby corrected as shown below:

In column 7, lines 43-44, delete "K=adj Listed" and insert -- K=adjusted --, therefor.

In column 9, line 35, in Claim 4, delete "adjust" and insert -- adjusting --, therefor.

Signed and Sealed this

Twentieth Day of January, 2009

JON W. DUDAS
*Director of the United States Patent and Trademark Office*